Nov. 20, 1962 L. E. GILREATH 3,064,778
HYDRAULIC WINCH CONTROL
Filed July 7, 1958 3 Sheets-Sheet 1
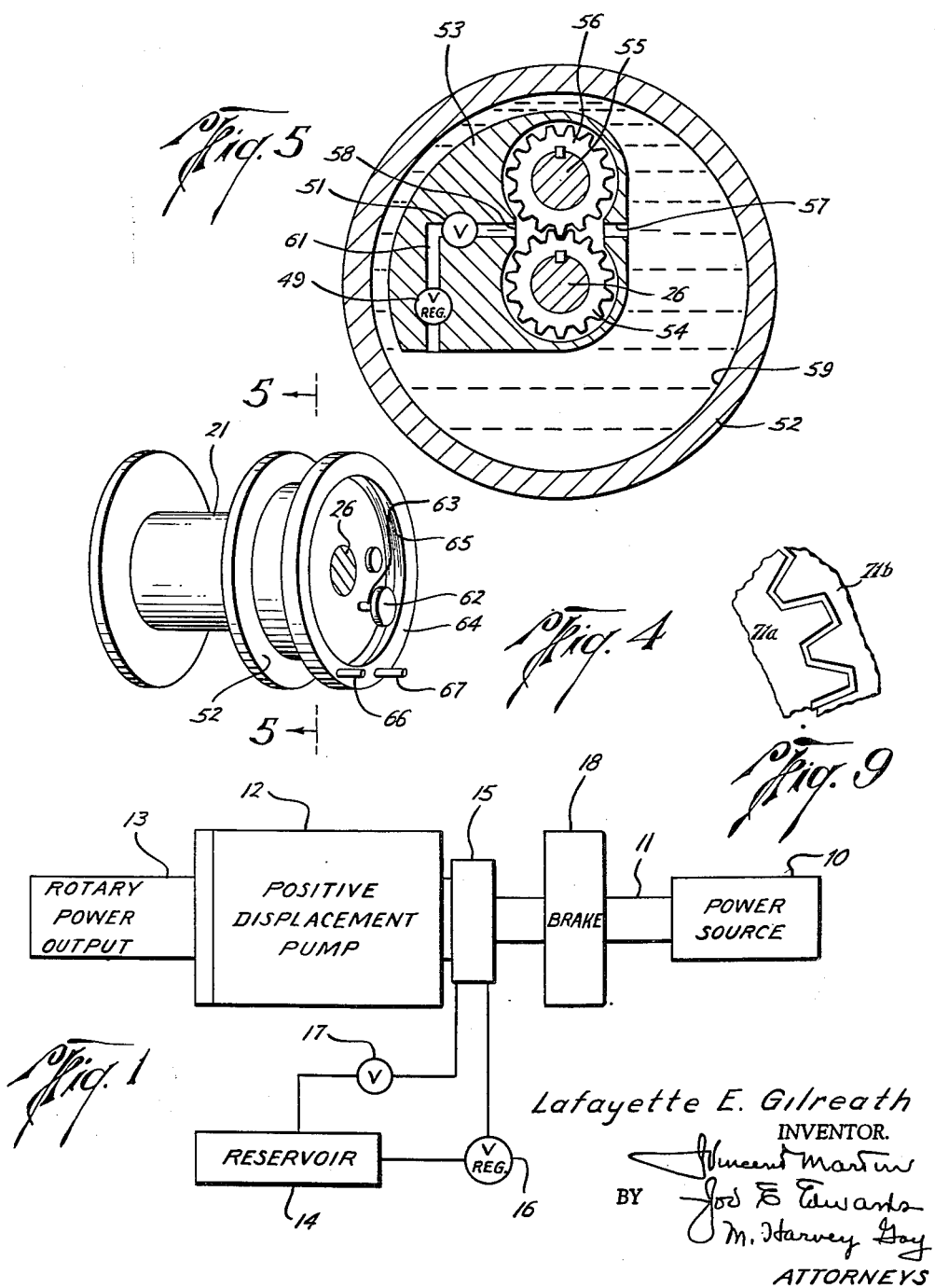
Lafayette E. Gilreath
INVENTOR.

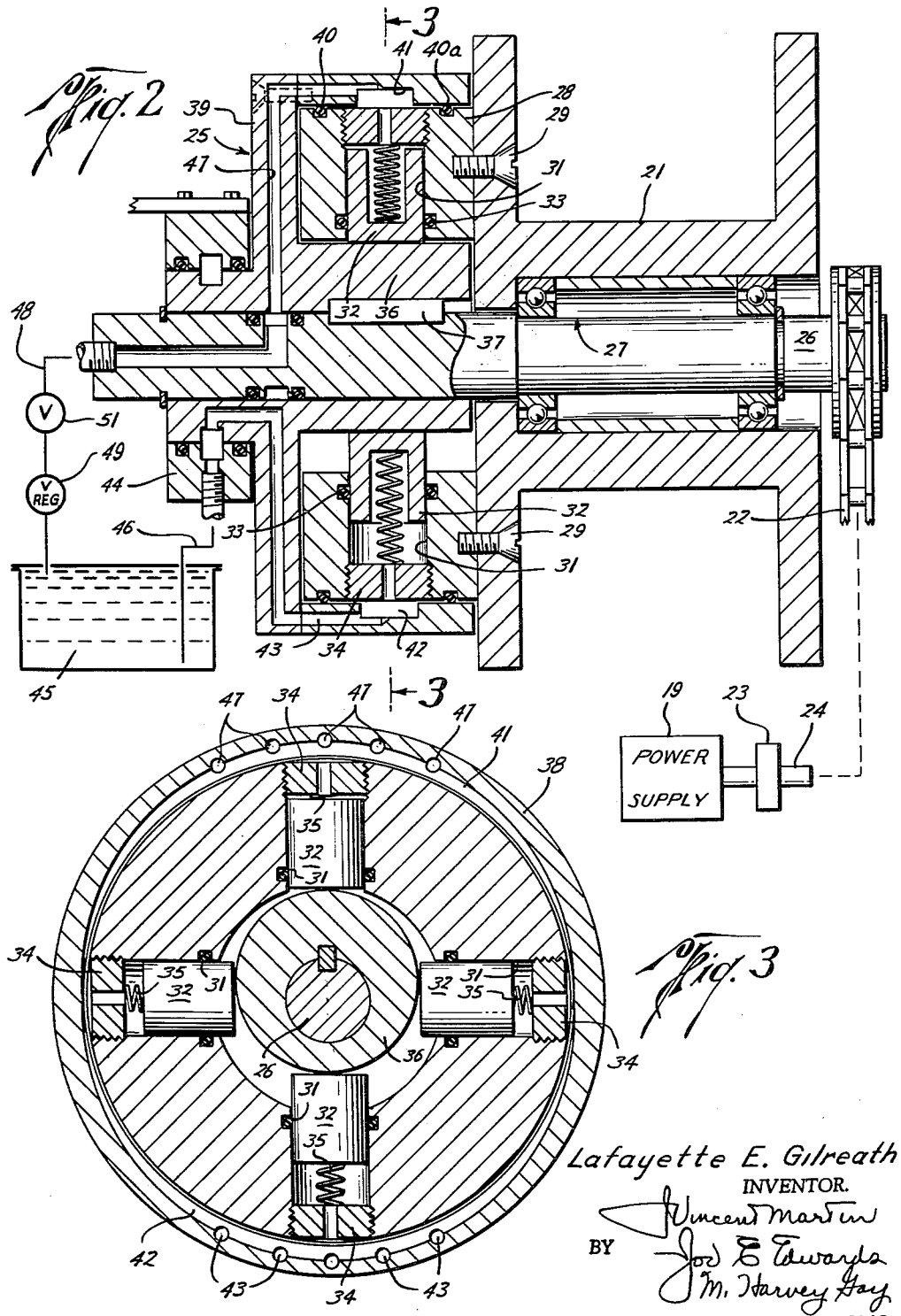

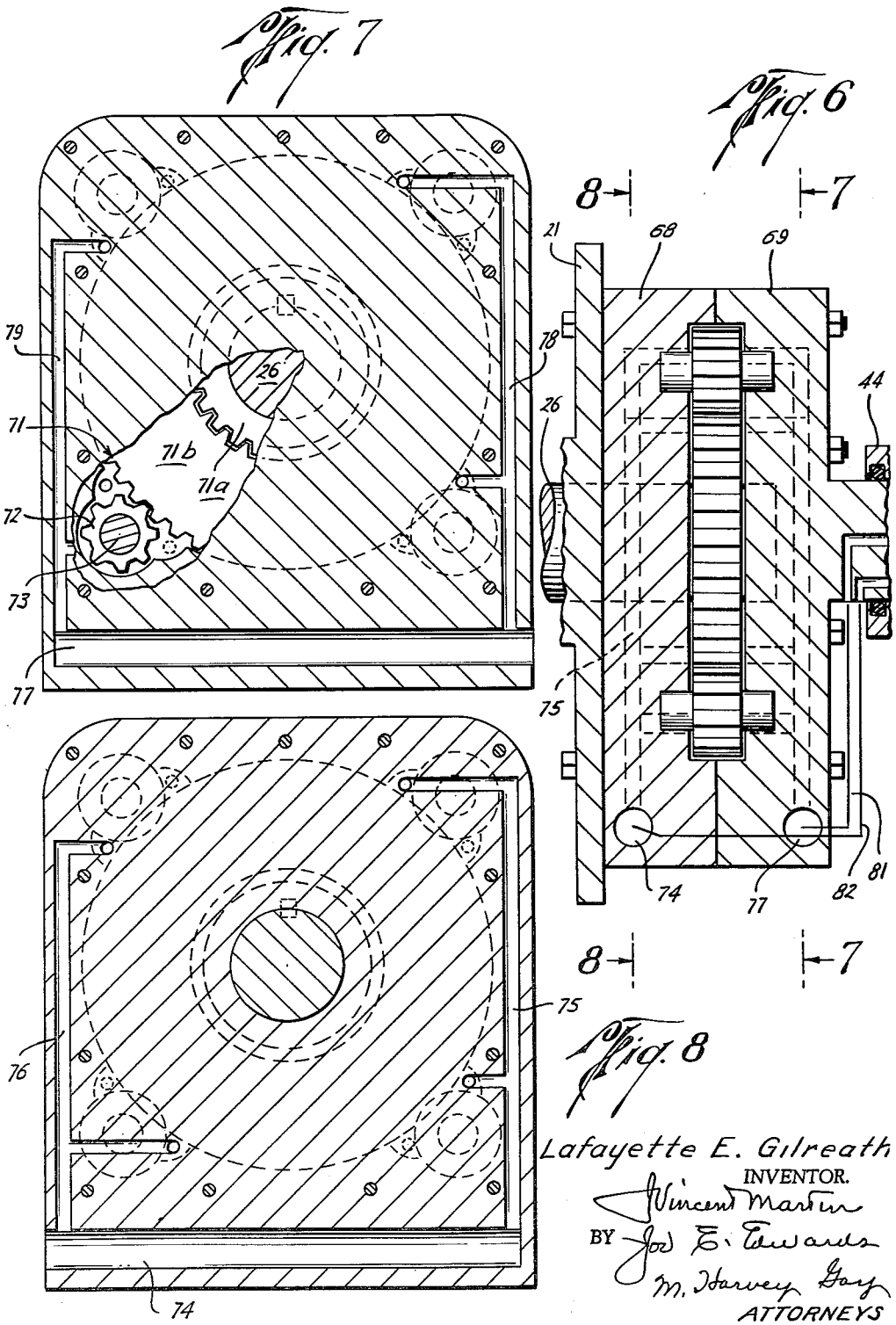

United States Patent Office 3,064,778
Patented Nov. 20, 1962

3,064,778
HYDRAULIC WINCH CONTROL
Lafayette E. Gilreath, Houston, Tex., assignor, by mesne assignments, to Halliburton Company, a corporation of Delaware
Filed July 7, 1958, Ser. No. 746,800
2 Claims. (Cl. 192—61)

This invention relates to hydraulic power transmission means and more particularly to the transmission of power by a hydraulic pump or motor.

Winch control for wireline operations in a well is very difficult. When going in the hole, the tool being lowered may hang up and the winch will overrun. When coming out of the hole, the tool may hang up and the line may part before the winch power can be reduced.

The problem is particularly acute in handling wireline perforating guns as the gun jumps some 30 or 40 ft. in the hole as it is fired. If the gun is permitted to jump and then fall this 30 or 40 ft. due to tis own weight, the socket connecting the wireline and gun will tend to jerk out leaving a fishing job.

In the past, this problem has been approached by using a torque converter in the power train to the winch running under sufficient r.p.m. to support the weight of the gun at the time it is fired. Thus upon the gun jumping, the torque converter will start operating to take in the line. However, the torque converter characeristically operates only at high r.p.m. and, therefore, gear reduction must be provided downstream of the torque converter. When this gear reduction begins to operate to take in 30 or 40 ft. of line, its inertia is such that it begins operation slowly and builds up in speed. Thus, some portion of the line is taken in the jump during the time that the gun is jumping and then falling. However, as the gun falls and pulls the wireline in tension, the inertia of the torque converter and gear reduction is such that the drum continues to turn. Thus the weight of the gun is opposed by continued rotation of the winch drum and again the rope socket may be pulled out.

A further general problem in the handling of wirelines is that an operator may put too much tension on a line and part the line.

From the above it will be seen that what is needed is a winch control which will permit drum rotation at a fairly low speed with very low inertia, which will prevent overrunning of the drum, and which will prevent the application of more than a predetermined amount of force on a wireline when the line is either static or being taken in. It is an object of this invention to provide such a winch control.

Another object is to provide in a power transmission system a device which limits the power which can be applied through the system.

Another object is to provide in a power transmission system an adjustable device for selectively limiting the power which can be applied through the system.

Another object is to provide an automatic brake for a shaft which has small inertia and will stop the shaft immediately upon the load on the shaft being removed.

Another object is to provide a power transmission system which will apply only a predetermined force even when resistance to the output of the system increases rapidly.

Another object is to provide a power transmission system which permits the substantially instantaneous stopping of the output shaft when the load on the shaft increases rapidly as when a tool on a wireline being taken in from a well by the shaft strikes an obstruction.

Another object is to provide a low r.p.m. hydraulic motor.

Another object is to provide a gear-type hydraulic motor in which the driving force to the output gear is balanced to avoid side thrust on the output gear.

Another object is to provide a hydraulic motor of the gear type in which stress on the output shaft is not transmitted to the output gear o prevent excessive wear on the gear teeth of the hydraulic motor.

Another object is to provide a hydraulic pump or motor which may be used as a clutch.

Another object is to provide a gear pump which may be used as a clutch or motor.

Another object is to provide a positive displacement hydraulic pump of the type employing pistons for use as a clutch.

Another object is to provide between two rotatable shafts a free-floating positive displacement pump which functions as a clutch.

Other objects, features and advantages of the invention will appear from the drawings, the specification and the claims.

In accordance with this invention, an output member of a power transmission system, such as a winch reel or drum, may be completely controlled by introducing into the power transmission train a free-floating positive displacement pump and controlling flow of liquid through the pump. One of the relatively moving parts of the pump is attached to the output shaft and the other relatively moving part of the pump is operated by the input shaft. Thus with free flow of liquid through the pump, there is little or no power transmitted to the output shaft. If the hydraulic fluid within the pump is prevented from flowing, a fluid lock will result and full power will be transmitted through the pump. In accordance with the preferred form of this invention, the fluid input and output of the pump are interconnected to provide for continuous circulation in a closed system, and one or more valves are provided for controlling the circulation through the pump. One of the valves may be a regulator valve which will maintain a selective back pressure on the pump. Thus if the output shaft is suddenly stopped, only a predetermined amount of force is applied to the stopped shaft and the pump acts as a clutch by pumping fluid through the regulator valve. If the power source is imposing a greater load than that determined by the regulator valve, the pump will be operated and the excess force will be dissipated through the pump. In running a tool into a well, the regulator valve will be set to maintain a desired back pressure with the input shaft locked in position. It the tool being lowered suddenly stops, the load on the output shaft will be removed, and the pump will immediately stop rotation of the output shaft and prevent overrunning of the reel.

Several new hydraulic pumps have been devised for use with this invention. One form of pump is particularly adaptable for use as a low speed hydraulic motor. This particular motor is of the gear type and employs symmetrically arranged input gears that balance the input load and remove side thrust from the output gear. The output gear is provided by a ring gear which surrounds and is geared to an inner gear on the output shaft of the motor. Thus, stress on the output shaft due to load resistance is absorbed between the ring gear and inner gear on the output shaft, and no stress is transmitted to the intermeshing pump gears.

While this invention is useful in many fields, it is particularly useful in handling of a wireline winch used in running tools in a well, and it will be particularly described in connection with such use.

In the drawings wherein there are shown illustrative embodiments of this invention and wherein like reference numerals indicate like parts:

FIGURE 1 is a schematic view of a power train embodying this invention;

FIGURE 2 is a view in vertical cross section through a reel and pump with the associated power source, brake, and fluid control system shown schematically;

FIGURE 3 is a view along the lines 3—3 of FIGURE 2;

FIGURE 4 is a perspective view of a modified form of pump for use in the power transmission system shown in FIGURE 2;

FIGURE 5 is a sectional view along the lines 5—5 of FIGURE 4 with the valves shown symbolically;

FIGURE 6 is a sectional view through a still further form of pump which may be utilized in the power train of FIGURE 2 and which is ideally suitable for use as a hydraulic motor;

FIGURE 7 is a view along the lines 7–7 of FIGURE 6; and

FIGURE 8 is a view along the lines 8–8 of FIGURE 7.

FIGURE 9 is a fragmentary view on an enlarged scale of the central and ring gears illustrating the ability of the central gear to cock without cocking the ring gear.

Referring first to FIGURE 1, power from any desired source, such as the engine of a wireline truck, is shown schematically at 10. Power from source 10 is transmitted through rotatable shaft 11 to the positive displacement pump 12. The pump 12 is secured to and rotates with the power output 13. Thus relative rotation of the power output and shaft 11 will cause relative movement of the pump parts of the pump 12. Hydraulic fluid from reservoir 14 is supplied to pump 12 through a collector ring 15. Circulation of this fluid is controlled by a back pressure regulator valve 16. If desired, a shut-off and/or metering valve 17 may also be provided in the line. In operation, the regulator valve 16 is set to a predetermined pressure which will determine the load which may be placed on power output 13 without relative movement of the pump parts. Of course so long as the load does not exceed this predetermined value, a fluid lock is present in the pump and a direct connection exists between shaft 11 and power output 13. If power output 13 is overloaded for any reason, then the load resistance may increase to a value in excess of that necessary to pump fluid past regulator valve 16. When this occurs, the pump parts of the positive displacement pump 12 move relative to each other to pump fluid past regulator valve 16 and the pump 12 functions as a clutch to permit relative rotation between shaft 11 and power output 13. Thus, the regulator valve may be set to provide a predetermined maximum load on reel 13, and an operator will not unintentionally overload the power transmission train due to the protection of pump 12 when the load resistance reaches the value determined by regulator value 16.

When power output 13 is a wireline reel and a tool is being run in a hole, the brake 18 is applied to maintain the shaft 11 stationary. The regulator valve 16 is set at a value which will permit the tool to run out under its own weight. If the tool hangs up in the well, this back pressure will prevent overrunning of reel 13 as there will not be sufficient force on the reel to overcome the back pressure of valve 16.

Reference is now made to FIGURES 2 and 3 wherein there is shown the preferred form of winch control. Power source 19 provides power for driving the winch drum 21 through a chain drive 22. A brake 23 of any desired form is provided for locking the power input shaft 24 in fixed position.

The winch drum and pump indicated generally at 25 are mounted on a shaft 26 which is supported in suitable journals, not shown, on the winch truck. The shaft 26 is driven by the chain drive 22.

In order to provide for selective rotation between the power input shaft and drum 21, the drum is mounted for rotation on the shaft by a bearing assembly indicated generally at 27. The drum 21 is generally conventional in form and in use will have wound thereon a conventional wireline.

The pump 25 surrounds the shaft 26 and is operated by relative rotation between shaft 26 and drum 21. A ring like cylinder block 28 is secured to the drum 21 by a plurality of studs 29. The block 28 is provided with radially extending cylinders 31 in each of which there is mounted a piston 32. A suitable sliding seal is provided by an O-ring 33 between the cylinder 31 and piston 32. The radially outer end of cylinders 31 is closed by ported plugs 34 to provide a means for confining a compression spring 35 between the pistons 32 and plugs 34.

The inner diameter of cylinder ring 28 is somewhat larger than the diameter of shaft 26, and an eccentric 36 is positioned in the annular space thus provided and non-rotatably mounted on the shaft 26 as by key 37. As best appears in FIGURE 3, rotation of the eccentric 36 combined with the action of springs 35 causes reciprocation of the several pistons 32 within the cylinders 31.

Suitable valving for the several pistons 31 is provided by a ring 38 which is carried by a radially extending flange 39 on eccentric 36 in a position to overlie the cylinder block 28. This ring has a constant radius inner diameter at its axial extremities and suitable seal means such as O-rings 40a and 40 seal between the ring and cylinder block 28. On opposite sides of the ring 38, grooves 41 and 42 are provided, the former providing a fluid outlet for the pump and the latter a fluid inlet for the pump. As best seen from FIGURE 3, each of these grooves extends through substantially a 180° arc and fluid is delivered to and received from the several cylinders 31 in the conventional manner for this type of pump.

The inlet 42 communicates with a plurality of conduits 43 which receive fluid from a collector ring 44. The collector ring 44 in turn receives fluid from a reservoir 45 through a conduit 46.

Fluid is expelled from the pump through a plurality of conduits 47 and empties into the reservoir 45 through conduit 48. Of course a suitable swivel, not shown, is provided in conduit 48.

In order to provide for a selective resistance to pumping of fluid by the pump 25, a regulator valve 49 of conventional construction controls flow through conduit 48. This valve is adjustable and may be set to maintain any desired back pressure on pump 25.

In some instances it is desirable to meter flow through the pump to provide for a constant speed of rotation of drum 21 when the power input is exerting sufficient force to cause pumping through regulator valve 49. Such a valve is shown at 51 in conduit 48 and also functions as a shutoff valve to positively prohibit flow through the pump.

In reeling in a line, the valve regulator will be set to maintain a fluid lock condition in pump 25 until resistance of a predetermined value is reached. This will be sufficiently high that the pump will normally operate under a fluid-lock condition and only serve as a safety clutch. Power from source 19 rotates shaft 26 which in turn rotates eccentric 36. If we assume the load resistance to be less than the value at which the regulator valve 49 was set for, then the eccentric cannot move the several pistons 32 against the fluid lock. Under these circumstances, rotative force will be applied from the eccentric through the pistons to cylinder block 28. The block 28 will in turn cause rotation of drum 21. If we assume the line to be suddenly stopped due to a tool hanging up in a collar in a well or for some reason the load resistance to increase above the value for which the regulator valve is set, then the pump 25 will begin to act as a clutch. Immediately upon the resistance increasing above the back pressure provided by regulator 49, the pistons will being to reciprocate and pump fluid through the regulator. This in turn will permit relative movement between the eccentric 36 and the cylinder block 28 and slow down rotation of drum 21. Of course as the load resistance increases substantially above the back pressure provided by regulator 49, then rotation of drum 21 will stop altogether. The latter would be the case when the wireline tool is hung in the well.

In running a tool in the hole, the regulator valve 49 will be set at a value which will permit cable to pay out under the load of the cable and tool but which will be greater than the force exerted by the wireline or cable if the tool being run hangs up in the well. Thus with normal running of the tool, the shaft 26 being locked against rotation by brake 23, the pump 25 will be constantly pumping fluid and drum 21 will be rotating relative to shaft 26. In the event the tool being run hangs up and its weight is no longer imposed on the wireline, the force rotating the drum 21 is less than the back pressure imposed by regulator valve 49 and a fluid lock condition will be set up which will stop rotation of drum 21. This stoppage will be very fast as the inertia of the pump and reel will be relatively small.

Referring now to FIGURES 4 and 5, a modified form of this invention is shown. In this form of the invention, a gear type pump is secured to the reel drum 13. This pump is entirely contained within a sealed housing 52 which is filled with liquid as shown in FIGURE 5. Within the housing 52 is a pump housing 53 which is secured to the housing 52. If desired, a portion of the housing 53 may be fabricated as an integral part of housing 52. Again the drum 21 is rotatably mounted on shaft 26 in the same manner as shown in FIGURE 2. Keyed to shaft 26 is a sun gear 54 which forms one gear of the gear pump. A stub shaft 55 is journaled in housing 53 and has splined thereon a planetary gear 56. When the shaft 26 is held against rotation and drum 21 is rotated, the planetary gear 56 rotates about sun gear 54. On the other hand if planetary gear 56 is held against rotation about sun gear 54, then shaft 26 and drum 21 must rotate together. To control rotation of planetary gear 56 about sun gear 54, the gears are constructed as gears of a gear pump and a fluid inlet 57 and a fluid outlet 58 to the pump is provided. The fluid inlet communicates directly with the reservoir 59 provided by housing 52. A conduit 61 interconnects outlet 58 with reservoir 59 to provide for continuous circulation of fluid through the pump.

Control of fluid passing through the pump is provided by a regulator valve 49 controlling flow through conduit 61. A metering valve 51 may also be provided for control of flow through conduit 61.

The operation of the gear type of pump is identical with the operation of the radial type of pump of FIGURE 2. The regulator may be used to hold a liquid lock in the gear pump which will cause rotation of the planetary gear about the sun gear until a differential is developed between shaft 26 and drum 21 which will overcome the resistance of regulator valve 49. Thereafter the planetary gear may revolve around the sun gear.

Referring to FIGURE 4, the regulator valve 49 is provided with a control handle 62 on stem 63 which projects beyond housing 52. The regulator valve 49, in this form of the invention, is regulated by axial movement of stem 63.

To provide for axial movement of stem 63, a control ring 64 having a V-shaped annular groove 65 in its inner periphery is provided. This ring is movable along its central axis on a pair of support rods 66 and 67 which are carried by supports not shown. The relief valve handle 62 projects into the notch 65. As the control ring 64 is arranged concentrically about shaft 26, the handle 62 will travel within the notch 65 as the drum 21 rotates. As the ring 64 will remain stationary, it may be easily shifted along the support bars 66 and 67 to change the setting of regulator valve 49. A like type of control could be provided for the metering valve 51 if desired.

FIGURES 6, 7 and 8 show a still further form of pump which may be used in this invention and which also may be used as a low speed hydraulic pump. This form of pump is made up in a housing having two parts 68 and 69 which are secured to the winch drum 21. A large central gear indicated generally at 71 is splined to shaft 26. Preferably this gear includes an inner gear 71a keyed to shaft 26 and an outer ring gear 71b having interior and exterior teeth surrounding the inner gear. The exterior teeth on the inner gear mesh with the interior teeth on the outer gear to form, in effect, a single gear. By providing this form of gear, the stress imposed on shaft 26 by the load on the drum is not transmitted back to the exterior teeth of the ring gear 71b which, as will be explained below, functions as a gear pump. Thus with wear of the bearings supporting shaft 26, the gear 71a will be permitted to cock slightly and this action will be accommodated by the intermeshing teeth between gears 71a and 71b and will not be transmitted to the outer gear teeth of ring gear 71b.

A plurality of idler gears 72 are carried by stud shafts 73 which are rotatably mounted in the housing as best shown in FIGURE 6. These idler gears are symmetrically placed about the inner gear 71b so that stress imposed by the engagement of the outer ring of teeth on gear 71, and the teeth of idler gears 72 will be canceled out. Hydraulic fluid is fed to the pump from a conduit 74. Fluid from the main conduit 74 passes from branch conduits 75 and 76 to one side of each of the idler gears 72. From FIGURE 8 it will be noted that this is a common side so that the pump action of the main gear and each idler gear is cumulative. Fluid leaves the pump through main conduit 77 and is fed from the vicinity of the idler gears to main conduit 77 through branch conduits 78 and 79. It will be noted by comparing FIGURES 7 and 8 that the conduits 78 and 79 terminate adjacent the idler gears on the opposite side from the termination of conduits 75 and 76.

Fluid from conduits 74 and 77 is passed by lines 81 and 82 to collector ring assembly 44 which in turn direct fluid through a reservoir and valve control system such as shown in FIGURE 2.

It will be appreciated that by mounting the housing 68—69 in stationary position and driving hydraulic fluid through the pump from a source of fluid pressure that the pump will act as a hydraulic motor. Due to the gear reduction provided by the small idlers and large center gear, a low speed motor will be provided.

When the pump of FIGURES 6 through 8 is used with the winch system shown in FIGURE 1, it operates in the same manner as heretofore explained in the description of the other forms of pump. Thus the device of FIGURES 6 through 8 may be mounted on a shaft 26 as indicated in FIGURE 6, which shaft will take the place of shaft 26 of the FIGURE 2 form of the invention. The gear housing 68 may be attached to the drum 21 as indicated in FIGURE 6 as a substitute for the radial piston type of device of FIGURE 2. The collector ring 44 as shown in FIGURE 6 is the collector ring 44 shown in FIGURE 2, and as above explained suitable conduits such as shown in FIGURE 2 will provide fluid for the device of FIGURES 6–8. Braking will be accomplished in this form of the invention by limiting the flow of hydraulic fluid through the idler and ring gear teeth, thus creating a hydraulic lock as in the case of the other forms of the invention.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Apparatus comprising, a housing, a cavity in said housing, a ring gear having interior and exterior teeth thereon, at least three idler gears symmetrically arranged about said ring gear and meshing with the exterior teeth on said ring gear and centering the ring gear therebetween, opposite walls of said cavity having a sliding fit with the opposite side faces of said ring and idler gears, a shaft journalled in the housing, a central gear non-rotatably mounted on said shaft in said cavity, said central gear having teeth loosely meshing with the interior teeth of said ring gear to provide a universal connection between the ring gear and central gear, said loose meshing teeth permitting cocking of said central gear upon wear in said shaft journals without cocking of said ring gear to protect the walls of said cavity and side faces of said ring gear from wear due to cocking of said shaft, and means including fluid conduit means communicating with each idler gear on opposite sides of the point of mesh between the idler and ring gears providing for flow of liquid across the idler gears.

2. Apparatus comprising a housing provided by two housing sections abutting each other, each abutting face of each housing section having a confronting identical circular recess therein, a ring gear having interior and exterior teeth thereon mounted in said circular recesses and contained thereby, at least three symmetrically arranged identical idler gear recesses confronting each other in said abutting faces of the housing sections arranged peripherally of said circular recesses, at least three idler gears in said recesses having teeth meshing with the outer teeth on said ring gear and centering the ring gear therebetween, opposite walls of said cavity having a sliding fit with the opposite side faces of said ring and idler gears, a hole through one of said housing sections, a shaft extending through said hole and journalled in said housing, a central gear non-rotatably mounted on said shaft in said cavity, said central gear having teeth loosely meshing with the interior teeth of said ring gear to provide a universal connection between the ring gear and central gear, said loose meshing teeth permitting cocking of said central gear upon wear in said shaft journal without cocking of said ring gear to protect the walls of said cavity and side faces of said ring gear from wear due to cocking of said shaft, conduit means in one housing section having outlets adjacent the idler gear recesses and arranged circumferentially about said ring gear on the same side of each idler gear, conduit means in the other housing section having outlets adjacent the idler gear recesses arranged circumferentially about said ring gear on the other side of each idler gear, said confronting recesses and conduit means in said two housing sections being mirror images of each other, and metering valve means controlling flow through the conduit means to control the rate of flow of the fluid between the ring and idler gears.

References Cited in the file of this patent
UNITED STATES PATENTS

| | | |
|---|---|---|
| Re. 22,577 | Thomas | Dec. 12, 1944 |
| 645,378 | Worth | Mar. 13, 1900 |
| 1,388,311 | Russell et al. | Aug. 23, 1921 |
| 1,561,549 | Kraft | Nov. 17, 1925 |
| 2,028,500 | Cook et al. | Jan. 21, 1936 |
| 2,304,907 | Goodson et al. | Dec. 15, 1942 |
| 2,329,594 | Corrigan | Sept. 14, 1943 |
| 2,371,227 | Dodge | Mar. 13, 1945 |
| 2,386,459 | Hautzenroeder | Oct. 9, 1945 |
| 2,387,230 | Bock | Oct. 23, 1945 |
| 2,420,305 | Donahew et al. | May 13, 1947 |
| 2,499,099 | Kenyon | Feb. 28, 1950 |
| 2,551,249 | Dickens | May 1, 1951 |
| 2,704,141 | Doshier | Mar. 15, 1955 |
| 2,720,297 | Arvidson | Oct. 11, 1955 |
| 2,743,628 | Scharaffa | May 1, 1956 |
| 2,759,376 | Chamberlin et al. | Aug. 21, 1956 |